United States Patent
Nitereka et al.

(10) Patent No.: US 8,708,635 B2
(45) Date of Patent: Apr. 29, 2014

(54) COMPACT ROLL-OFF TRAILER CONFIGURATIONS FOR CONTAINER-HAULING APPLICATIONS

(75) Inventors: Claver Nitereka, Wixom, MI (US); Ronald Ostrowski, Wyandotte, MI (US); John Pawl, Sterling Heights, MI (US)

(73) Assignee: Benlee, Inc.

( * ) Notice: Subject to any disclaimer, the term of this patent is extended or adjusted under 35 U.S.C. 154(b) by 1428 days.

(21) Appl. No.: 11/745,198

(22) Filed: May 7, 2007

(65) Prior Publication Data

US 2008/0056868 A1 Mar. 6, 2008

Related U.S. Application Data

(60) Provisional application No. 60/798,092, filed on May 5, 2006.

(51) Int. Cl.
*B60P 1/00* (2006.01)
*B60P 1/04* (2006.01)
*B60P 1/16* (2006.01)
*B60P 1/43* (2006.01)

(52) U.S. Cl.
USPC .......................... 414/480; 414/478; 414/491

(58) Field of Classification Search
USPC ............. 414/478, 477, 479, 480, 491
See application file for complete search history.

(56) References Cited

U.S. PATENT DOCUMENTS

| | | | |
|---|---|---|---|
| 3,606,059 A * | 9/1971 | Haberle | 414/478 |
| 4,529,349 A * | 7/1985 | Lutz | 414/478 |
| 5,183,371 A * | 2/1993 | O'Daniel | 414/477 |
| 5,478,190 A * | 12/1995 | Helton | 414/530 |
| 5,678,978 A * | 10/1997 | Markham | 414/477 |
| 6,641,353 B2 * | 11/2003 | Oliver | 414/500 |
| 7,192,239 B2 * | 3/2007 | Marmur et al. | 414/478 |

OTHER PUBLICATIONS

Galbreath. Model: A-200 Roll-off Trailer. 1993.

* cited by examiner

*Primary Examiner* — Scott Lowe
(74) *Attorney, Agent, or Firm* — Gifford, Krass, Sprinkle, Anderson & Citkowski, P.C.

(57) ABSTRACT

A compact roll-off trailer is short and light, but able to carry a large load. As such, the unit competes with roll-off trucks. A horizontally tilt frame has a forward section coupled to a king-pin assembly, a rear section with wheels on at least two axles, and a mid section. A frameless version uses a set of opposing arms as opposed to a separate, non-tilting frame. A single hydraulic cylinder has a retracted state wherein the lift frame is generally horizontal for hauling, and an extended state wherein the lift frame is pivoted at an angle for loading and unloading. A mechanism may be provided for extending the rearward portion of the lift frame to ground level when the hoist frame is pivoted, and a mechanism for pulling a cable with a container attached thereto onto the lift frame for hauling. The mechanism for extending the rearward portion of the lift frame may either include a 'stinger tail' or a slide frame on the lift frame a hydraulic cylinder for extending and retracting the slide frame. The latter configuration may include one or two sets of rollers to accommodate both 'inside' and 'outside' type containers. A "dead-lift" container-pulling mechanism may also be provided.

4 Claims, 3 Drawing Sheets

COMPACT ROLL-OFF TRAILER CONFIGURATIONS FOR CONTAINER-HAULING APPLICATIONS

REFERENCE TO RELATED APPLICATION

This application claims priority from U.S. Provisional Patent Application Ser. No. 60/798,092, filed May 5, 2006, the entire content of which is incorporated herein by reference.

FIELD OF THE INVENTION

This invention relates generally to roll-off trailers and, in particular, to a compact roll-off trailer designed to compete with roll-off trucks.

BACKGROUND OF THE INVENTION

In hauling containers for transporting scrap, waste, environmentally hazardous materials, recycling and the like, it is common to employ roll-off trailers. With such a trailer, a portion of the structure remains horizontally aligned and connected to the axles and cab or a tractor by way of a king-pin assembly, whereas the second portion of the structure pivots upwardly from their rearward joint, enabling the containers to be pulled up and onto the trailer from the ground, transported, unloaded and/or dumped. To facilitate the unloading procedure, the lift frame is again raised up, enabling the container(s) to roll-off and back on to the ground, hence the term "roll-off." Units of this type may or may not have a separate frame under the lift frame.

There are many different types and styles of roll-off trailers in service today, depending upon the application at hand. For light-duty applications, a single-container trailer or "one-box" design may be sufficient, and may employ only a few axles. Such a configuration would be suited, for example, to the short-distance hauling or smaller roll-off style containers. For longer distances, a two-box design may be more appropriate, whereas, for very heavy loads, multi-axle trailers are employed.

Despite the popularity of one-box trailers, they tend to be relatively long and difficult to maneuver in certain situations. Thus, the need remains for a roll-off trailer that is short and maneuverable, ideally as maneuverable as a roll-off truck, which is typically short; i.e., under 40 feet.

SUMMARY OF THE INVENTION

This invention improves upon existing designs by providing a compact roll-off trailer that short and light but able to carry a large, heavy load. As such, the unit competes with roll-off trucks.

The trailer includes a king-pin section configured for attachment to a tractor and a tilt frame operated by a single hydraulic lift cylinder (as opposed to two). In the preferred embodiments, the tilt frame has a length 30 feet, more or less, to carry a single, 30-foot container or 24 feet, more or less, to carry a single, 24-foot container. Thus, the tilt frame may be in the range of 29 to 32 feet for 30-foot boxes or 23 to 26 feet for 24-foot boxes. The invention would include other length tilt frame if the purpose is to carry a single 24- or 30-foot container.

The invention may comprises a "frameless design," wherein the single hydraulic lift cylinder having a first end coupled to the king pin section and a second end attached to the lift frame. In this case the tilt frame pivots on the rear wheels. Alternatively, a non-tilting frame may be used which remains generally horizontal as the tilt frame pivots.

A mechanism is provided for pulling a cable with a container attached thereto onto the lift frame for hauling. The cable-pulling mechanism further comprises a slide plate, a single hydraulic cylinder having a first end attached to the lift frame and a second end attached to the slide plate, and a plurality of pulleys on the slide plate and lift frame around which the cable is reeved. Alternatively, the cable-pulling mechanism may comprise a winch or set of rollers and guides comprising a dead lift mechanism.

The mechanism for extending the rearward portion of the lift frame may either include a 'stinger tail' or a slide frame on the lift frame a hydraulic cylinder for extending and retracting the slide frame. The latter configuration may include one or two sets of rollers to accommodate both 'inside' and 'outside' type containers.

DETAILED DESCRIPTION OF THE INVENTION

Figure 1:
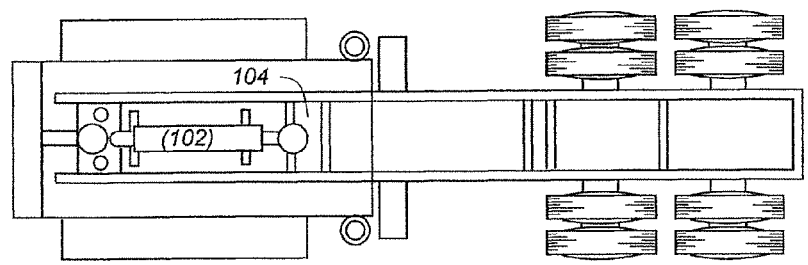
FIG. 1 is a simplified top-down illustration of the preferred embodiment.
Figure 2A:
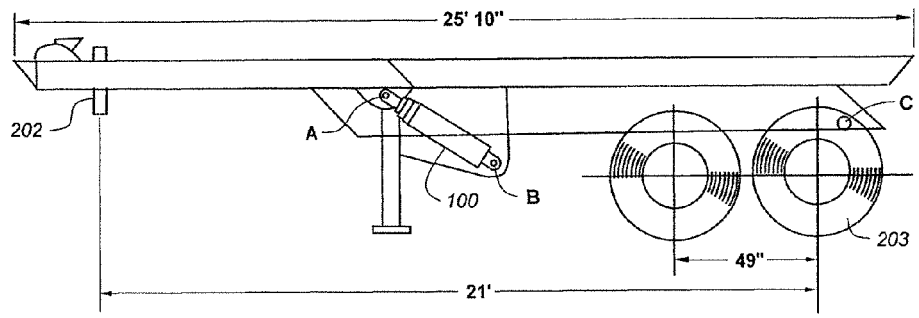
FIG. 2A is a side-view drawing showing a non-articulated condition.
Figure 2B:
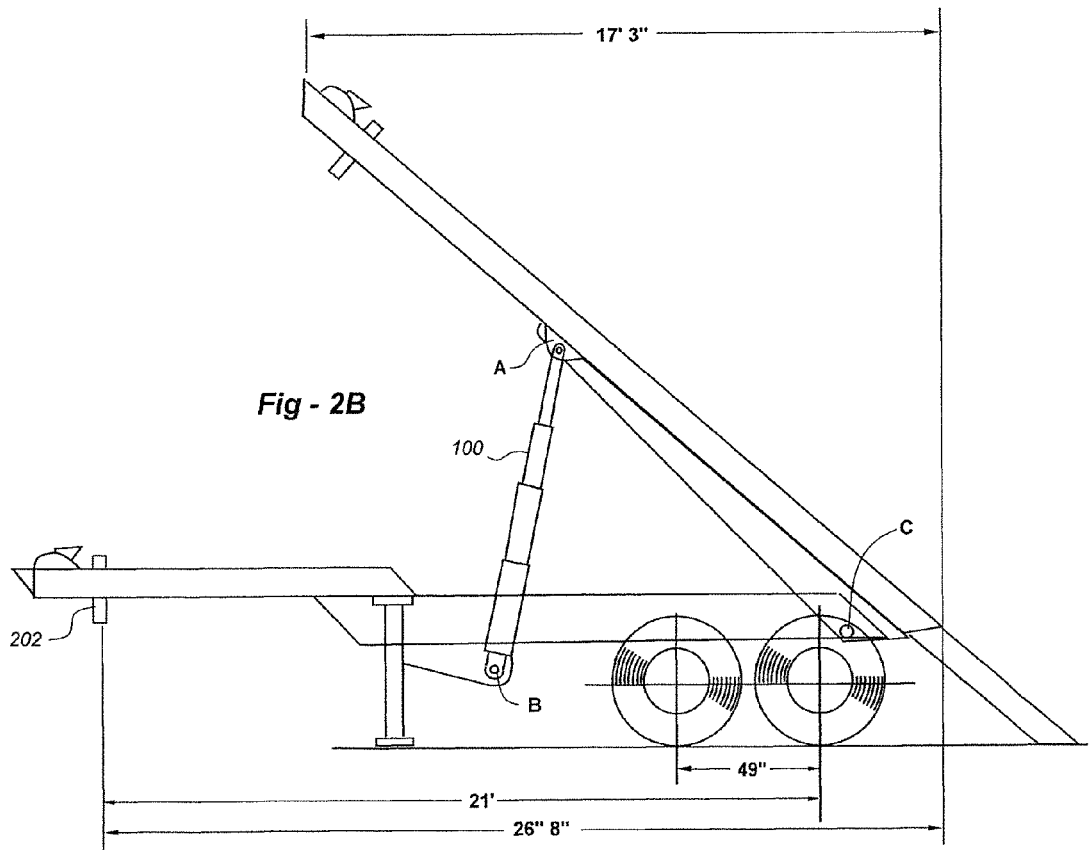
FIG. 2B is a side-view drawing showing an articulated condition.
Figure 3:
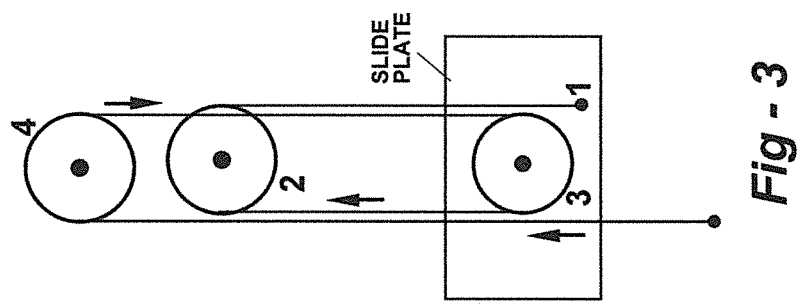
FIG. 3 is a schematic diagram showing multi-part cable routing facilitating the use of a single, light-weight hydraulic cylinder for frame lifting.

FIG. 1 is a simplified, top-down illustration of one embodiment of the invention FIGS. 2A and 2B are side-view drawings showing the tilt frame 110 in a non-articulated and articulated configuration, respectively. Beginning with FIG. 2A, the overall length of the trailer in the retracted position allows industry-standard 24-foot containers to be hauled. The distance from the king-pin 202 to the rearmost axle is approximately 21 feet, and the distance between the two rear axles between wheels 203 is 49 inches.

In contrast to competing designs, a single (as opposed to double) hydraulic cylinder 100 is used to raise the tilt frame. This cylinder is disposed between points A and B, with the pivot point for the lift frame being positioned at point C. In this embodiment, the tilt mechanism hinges in the range of 40-50 degrees for dumping, resulting in a length of just over 17 feet from the front of the tilt frame to the back of the truck, as shown in FIG. 2B. In the articulated position, the rearmost point of the tilt mechanism extends slightly, but the overall length of the trailer is still less than 27 feet with the tilt frame raised.

Considerable experimentation was used to determine proper placement of the lift cylinder 100, since it must meet the competing requirements of not interfering with any of the elongated members comprising a frame while, at the same time, being able to extend past vertical as shown in FIG. 2B. The placement of the points A, B and C on the trailer met these conflicting requirements. Point B is approximately midway between the front and back of the trailer, and with a tilt frame having a length of approximately 24 feet, a dump angle of 45-50 degrees is achieved with the cylinder 100 extended.

To ensure that the back section of the tilt frame extends to ground level, two mechanisms may be used. The first, shown schematically in FIG. 2B, involves the use of a 'stinger tail' as is commonly known in the trade. In this configuration, telescoping rails are driven out and in by a hydraulic cylinder (not shown), enabling the back end of the tilt frame to reach ground level, as shown. An alternative configuration is described in detail later on.

The embodiment of the invention just described, in a two-axle version, will legally carry up to 41,108 lbs. (in some states), which includes an approximately 22-foot long (30 yard) box and its contents. This is significantly greater than any other design, particularly with such a short length. This serves approximately 70 percent of industry needs. Other embodiments enable larger loads to be carried. For example, a somewhat larger unit can carry up to a 30-foot box with two or three axles for a weight of about 16,000 and 20,000 pounds, respectively, meeting about 85 percent of current needs. The third axle may or may not be a 'cheater' (smaller) axle, and may or may not function as a lift axle.

In all embodiments of the invention, a lightweight cable-pulling mechanism is used. In one configuration, a multi-part cable routing or "reeving" system is used, as shown in FIG. 34. In this case, a single, lightweight cylinder 102 in FIG. 1 pushes on a slide plate 104, causing a cable dressed around three pulleys to extend and retract, depending upon the movement of the slide plate. This allows for an extremely lightweight yet powerful pulley and release mechanism. A winch may alternatively be used for even greater weight reduction.

There are also two different types of hooks on boxes in the industry. The most common is a "standard hook," which is almost 95 percent of the market. The other is a "dead lift" (used in areas such as Chicago, Ill.), would mean this invention would not have an extendable tail, but instead would just have a wheel/roller assembly at the read of the lift frame.

There are also two types of container box rails currently in use in the industry. The first, called the 'outside' type has parallel rails that ride on rollers extending outwardly from the outer surfaces of the tilt frame. The second type, called the 'inside' type, has narrower rails that ride on rollers extending upwardly from the upper surface of the tilt frame. One disadvantage of the stinger tail mechanism is that is that a step-wise discontinuity 210 is created when the stinger is extended, thereby precluding the use of inside-type containers without further modification.

Figure 4A:
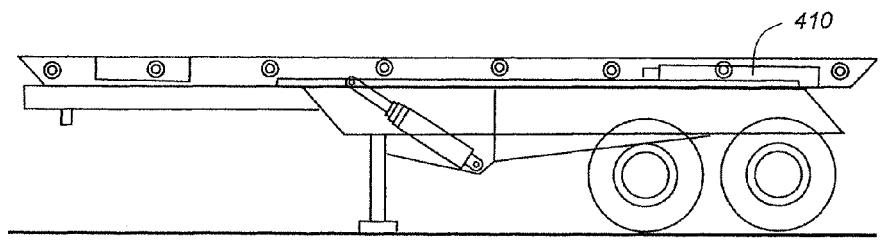
FIG. 4A is a side-view drawing showing a non-articulated condition of an embodiment including an inventive stinger tail and "inside-out" capability.
Figure 4B:
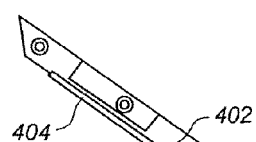
FIG. 4B is a side-view drawing showing the articulated condition of the embodiment of FIG. 4A.
Figure 4B:
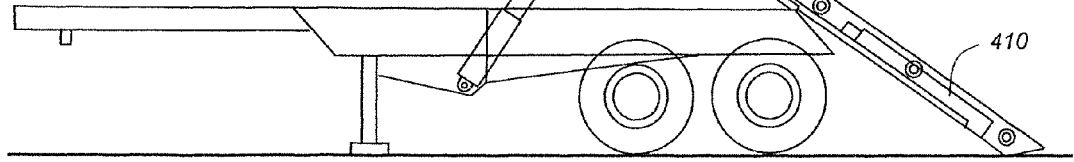

The embodiment of FIGS. 4A and 4B accommodates inside, outside, or both inside and outside type containers. Although this capability is described in conjunction with a compact roll-off trailer, it may be used with trailers of any length. Referring to FIG. 4B, this aspect of the invention uses a slide frame 402 coupled to the tilt frame 404. When the tilt frame is lowered, as shown in FIG. 4A, these two frames are generally co-extensive. However, when the tilt frame is raised, the slide frame is shifted backwardly with a hydraulic cylinder 410 such that the back end of the slide frame reaches the ground as shown in FIG. 4B.

Figure 5:
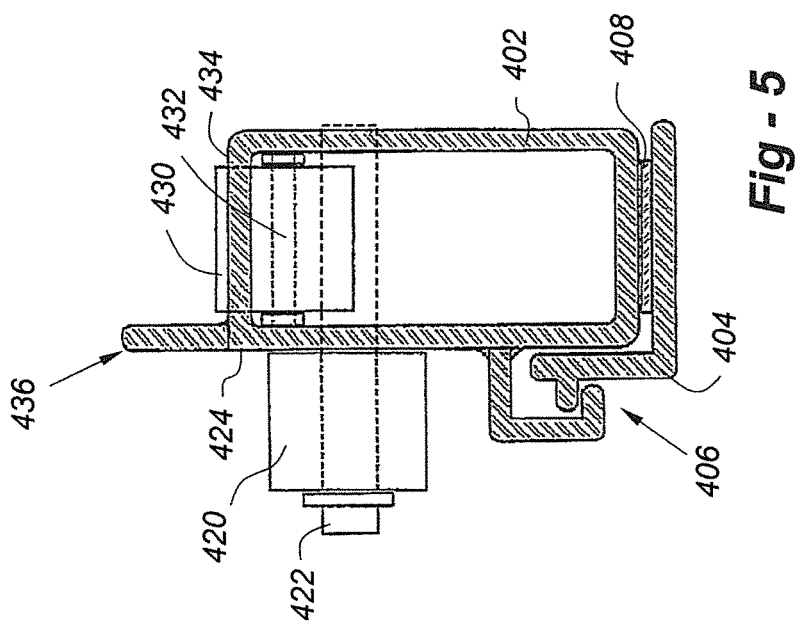
FIG. 5 is a cross-sectional detail drawing that helps to explain the "inside-outside" capability.

FIG. 5 is a detailed cross section better illustrating the relationship between the slide frame 402 and tilt frame 404. An interlocking mechanism 406 is used along most of the length to ensure that the two frames slide properly without separation, and grease pads 408 are provided for smooth operation. Since the entire slide frame moves, rollers 420 on pins 422 may be provided on the outer surface 424 of the frame to accommodate outside-type containers, and rollers 430 on pins 432 extending above the upper surface 434 of the frame accommodate inside-type containers. Lip 436 (and a mirror image lip on the opposing rail) are provided to maintain the rails of the inside-type container. Using the mechanism just described, either or both sets of rollers may be provided.

All embodiments of the invention may be configured with frame or frameless construction. All can use an outside rail, inside/outside rail, or just an inside rail. The frame members may be made from I beams, or from assembled stock. The "upper" (lift frame) is preferably made from steel tubing or assembled stock. The frame(s) and other materials may be made from steel and or aluminum of varying strength.

We claim:

1. A compact roll-off trailer, comprising:
a trailer frame including a front, king-pin section configured for attachment to a tractor and rear section including a plurality of ground-contacting wheels;
the trailer frame being of a rigid construction, and with a fixed length, such that at all times the ground-contacting wheels remain at a fixed distance relative to the front, king-pin section;
a tilt frame having forward section and a rearward section defining a length to carry up to a single, 24-foot container;
the tilt frame being coupled to the trailer frame at a single, fixed pivot axis such that the tilt frame only pivots and does not slide or translate relative to the trailer frame;
a hydraulic lift cylinder having a first end coupled to the trailer frame and a second end attached to the tilt frame, the lift cylinder having a retracted state wherein the tilt frame is generally horizontal and an extended state wherein the tilt frame is pivoted at an angle with the rearward section of the tilt frame spaced apart above a ground surface;
a retractable tail mechanism including a set of telescoping rails driven in and out of the tilt frame by a hydraulic cylinder, the mechanism enabling the telescoping rails to be retracted during travel to minimize the length of the tilt frame, and extended from the rearward section of the tilt frame to reach ground level for container loading and unloading; and
a mechanism for pulling a cable with a container attached thereto onto the tilt frame for hauling, the cable-pulling mechanism further comprising:
a slide plate,
a hydraulic cylinder having a first end attached to the tilt frame and a second end attached to the slide plate, and
a plurality of pulleys on the slide plate and tilt frame around which the cable is reeved.

2. The compact trailer of claim 1, wherein the tilt frame has two outer rails with upper surfaces and rollers to accommodate 'inside' type containers.

3. The compact trailer of claim 1, wherein the tilt frame has two outer rails with outer surfaces and rollers to accommodate 'outside' type containers.

4. The compact trailer of claim 1, wherein the tilt frame has two outer rails with upper surfaces and outer surfaces, both with rollers to accommodate both 'inside' and 'outside' type containers.

* * * * *